United States Patent
Lai

(10) Patent No.: US 9,092,972 B2
(45) Date of Patent: Jul. 28, 2015

(54) WIRELESS SIGNAL ACCESS APPARATUS AND METHOD FOR REMOTELY CONTROLLING APPLIANCE THROUGH THE SAME

(75) Inventor: Chien-Ming Lai, Taichung (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 629 days.

(21) Appl. No.: 13/331,338

(22) Filed: Dec. 20, 2011

(65) Prior Publication Data

US 2012/0154113 A1    Jun. 21, 2012

(30) Foreign Application Priority Data

Dec. 21, 2010    (TW) .................... 99144977 A

(51) Int. Cl.
*G08C 17/02* (2006.01)
*H04L 12/24* (2006.01)
*H04M 1/725* (2006.01)
*H04W 88/10* (2009.01)

(52) U.S. Cl.
CPC ............ *G08C 17/02* (2013.01); *G08C 2201/21* (2013.01); *G08C 2201/40* (2013.01); *G08C 2201/93* (2013.01); *H04L 41/0226* (2013.01); *H04M 1/72533* (2013.01); *H04W 88/10* (2013.01)

(58) Field of Classification Search
CPC ............. H04L 12/2818; H04L 12/282; H04L 41/0226; H04L 12/283; G08C 2201/93; G08C 2201/42; G08C 2201/21; G08C 2201/40; G08C 17/02; H04M 1/72533; H04N 21/42222; H04W 88/08; H04W 88/10
USPC .......................... 340/5.61; 370/338, 310, 476
See application file for complete search history.

(56) References Cited

U.S. PATENT DOCUMENTS

| | | | |
|---|---|---|---|
| 2004/0249925 A1* | 12/2004 | Jeon et al. ..................... | 709/223 |
| 2011/0026436 A1* | 2/2011 | Karaoguz et al. .............. | 370/254 |
| 2013/0142181 A1* | 6/2013 | Makim et al. .................. | 370/338 |

* cited by examiner

Primary Examiner — Brian Zimmerman
Assistant Examiner — Sara Samson
(74) Attorney, Agent, or Firm — Chun-Ming Shih

(57) ABSTRACT

A wireless signal access apparatus receives wireless signals of IEEE 802.11 standard for controlling at least one appliance. The appliance may receive control signals of IEEE 802.15 standard, to be controlled according to the control signals. The wireless signal access apparatus receives the wireless signals having control data to generate the control signal of IEEE 802.15 standard, and send it to the appliance for omnidirectional remote control of the appliance.

18 Claims, 3 Drawing Sheets

WIRELESS SIGNAL ACCESS APPARATUS AND METHOD FOR REMOTELY CONTROLLING APPLIANCE THROUGH THE SAME

BACKGROUND OF THE INVENTION

1. Field of the Invention

The present invention relates generally to a remote control technology, and more particularly, to a wireless signal access apparatus to remotely control an appliance, and a method for remotely controlling the appliance through the apparatus.

2. Description of the Related Art

With advancement in science and technology today, more and more appliances at home or at office are operated by remote controllers. However, the conventional remote controllers emit infrared rays to remotely control the appliances, so they need to be aimed right at the appliances at operation. Otherwise, there are always many remote controllers at home for various appliances, which is quite inconvenient for management.

SUMMARY OF THE INVENTION

The present invention is to provide a wireless signal access apparatus and a method for remotely controlling an appliance through the apparatus so that a terminal device that can wirelessly connect to the apparatus of the present invention can be used to remotely control the appliance.

Accordingly, the present invention provides a wireless signal access apparatus for receiving wireless signals complied with IEEE 802.11 standard sent from a terminal device, and generating and sending control signals according to the received wireless signals to control an appliance. The wireless signal is respectively classified into a first type wireless signal and a second type wireless signal, and the control data and an identification code are attached to the first type wireless signal. In one aspect, the wireless signal access apparatus includes a processor, a memory electrically connected to the processor, a transceiver electrically connected to the processor, an antenna electrically connected to the transceiver, and a remote control unit electrically connected to the processor and the transceiver. A code identical to the identification code is stored in the memory. The transceiver is for transmitting the wireless signals received through the antenna to the processor. The processor is for identifying the wireless signals as the first type wireless signals by comparing the code stored in the memory to the identification codes, and transmitting the first type wireless signals to the remote control unit. The remote control unit is for retrieving and examining the control data attached to first type wireless signals from the processor, generating control signals according to the control data, and sending out the control signals by the antenna through the transceiver.

In another aspect, the wireless signal access apparatus includes a processor, a memory electrically connected to the processor, a transceiver electrically connected to the processor, an antenna electrically connected to the transceiver, and a remote control unit electrically connected to the processor and the transceiver. A code identical to the identification code is stored in the memory. The transceiver is for transmitting the wireless signals received through the antenna to the processor. The processor is for identifying the wireless signals as the first type wireless signals by comparing the code stored in the memory to the identification codes, and retrieving and examining the control data attached to first type wireless signals transmitting the first type wireless signals to the remote control unit. The remote control unit is for generating a control signal according to the control data, and sending out the control signal by the antenna through the transceiver to remotely control an appliance.

In still another aspect, the wireless signal access apparatus includes a processor, a memory electrically connected to the processor, a transceiver electrically connected to the processor, an antenna electrically connected to the transceiver, a retrieving and examining unit electrically connected to the processor, and a remote control unit electrically connected to the retrieving and examining unit and the transceiver. A code identical to the identification code is stored in the memory. The transceiver is for transmitting the wireless signals received through the antenna to the processor. The processor is for identifying the wireless signals as the first type wireless signals by comparing the code stored in the memory to the identification codes, and transmitting the first type wireless signal to the retrieving and examining unit. The retrieving and examining unit is for retrieving and examining the control data attached to the first type wireless signal from the processor. The remote control unit is for generating a control signal according to the control data, and sending out the control signal by the antenna through the transceiver to remotely control an appliance Moreover, the present invention provides a method for remotely controlling an appliance by a wireless signal access apparatus, comprising the steps of receiving wireless signals sent from a terminal device; identifying the wireless signals as the first type wireless signals by comparing a predetermined code to an identification code filled in a destination address field of the wireless signal and determining the predetermined code and the identification code being identical; and retrieving and examining the control data filled in a frame body field of the first type wireless signal to obtain a command according to the control data, generating a control signal complied with IEEE 802.15 standard according to the command, and sending the control signal to the appliance for operation.

Preferably, the control signals are Zigbee signals complied with IEEE 802.15.4 standard.

As the wireless signal complied with IEEE 802.11 standard and the control signal complied with 802.15.4 are omnidirectional wireless signals, the convenient remote control for the appliances by the terminal device can be achieved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE INVENTION

The detailed description and technical contents of the present invention will be explained with reference to the accompanying drawings. However, the drawings are illustrative only but not used to limit the present invention.

Figure 1:
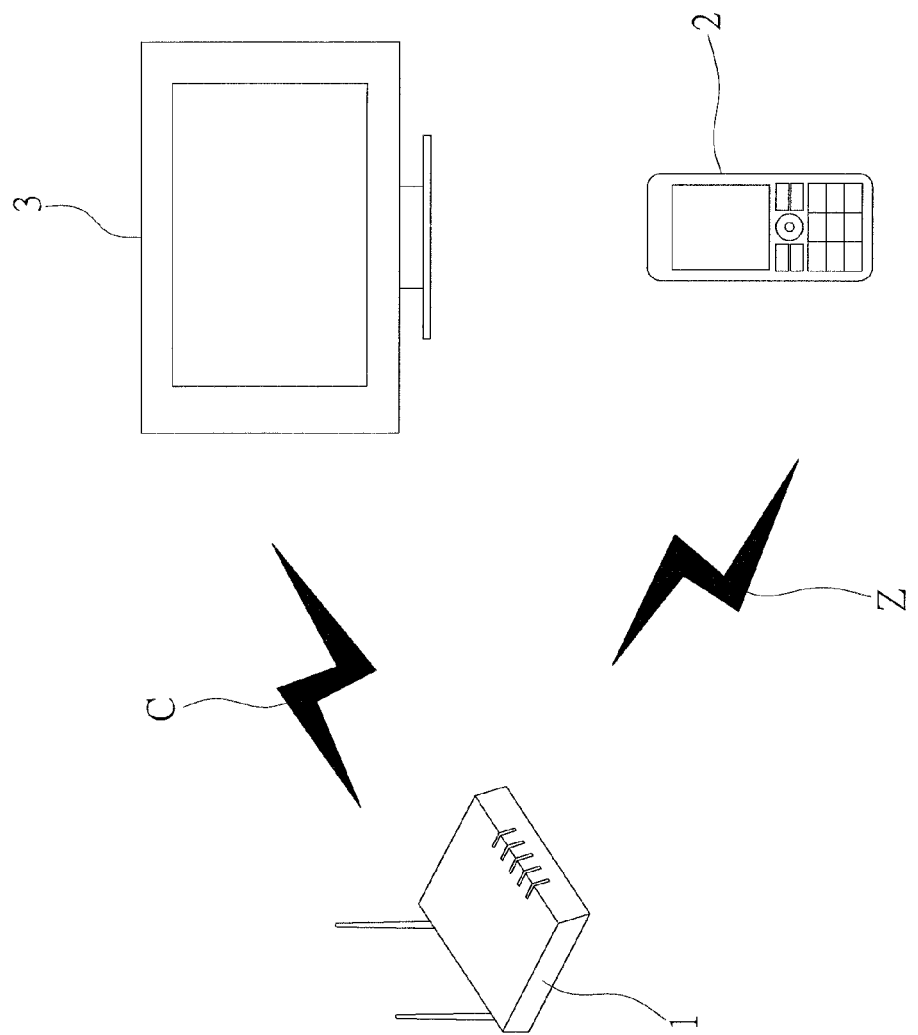
FIG. 1 is a sketch diagram showing the wireless remote control according to a first preferred embodiment of the present invention.

As shown in FIG. 1, a wireless signal access apparatus 1 according to a first preferred embodiment of the present invention is a wireless access point (wireless AP) and can receive wireless signals Z complied with IEEE 802.11 standard from a terminal device 2 and transmit Zigbee control signals C complied with IEEE 802.15.4 standard to a television 3 in order to control the television 3, such as turning on and off the TV, channel switch, and various types of adjustment operations (e.g. volume, brightness and color contrast, etc.) of the TV. In the present embodiment, the terminal device 2 is a smart phone; however, it also can be a personal computer, a laptop computer, a personal digital assistance (PDA), or other devices that may wirelessly connect to the wireless network. The wireless signal Z sent from the terminal device 2 includes a first type wireless signal and a second type wireless signal. In the present embodiment, each of the first and second type wireless signals comprises a frame format complying with IEEE 802.11 standard. It is noted that control data and an identification code will be carried by the first type wireless signal, wherein the control data and identification code are separately attached into a frame body field and a destination address field of the frame according to the frame format defined in IEEE 802.11 standard. In the present embodiment, the identification code is constructed with 48 bits and can be defined as MAC address identifier that is not used in any network equipment. It is noted that the identification code is used to be recognized by the wireless signal access apparatus whether the wireless signal Z is carrying the control data.

Figure 2:
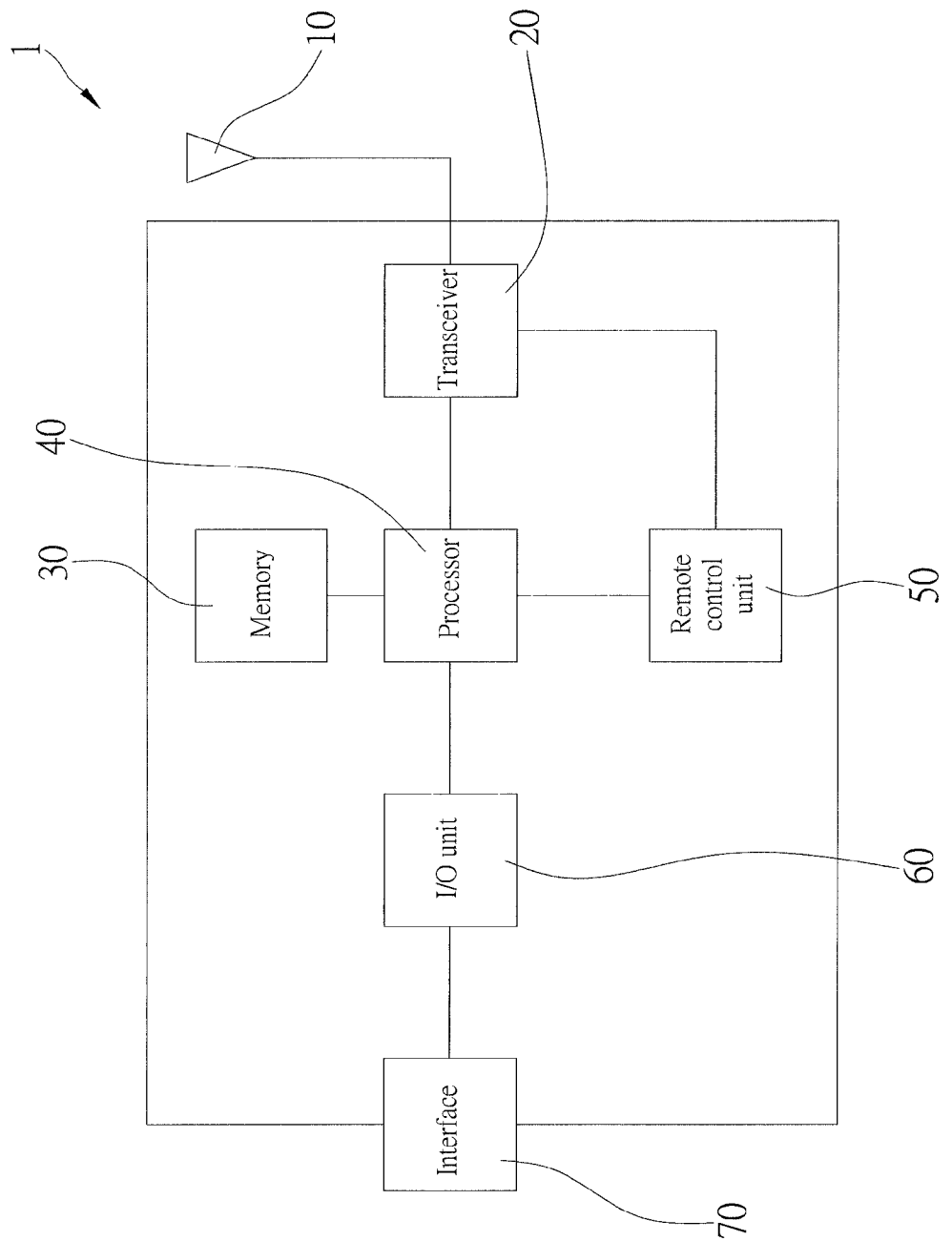
FIG. 2 is a block diagram of a wireless signal access apparatus according to the first preferred embodiment of the present invention.

As shown in FIG. 2, the wireless signal access apparatus 1 includes an antenna 10, a transceiver chip 20, a memory 30, a processor 40, a remote control unit 50, an input/output (I/O) unit 60, and an interface 70.

The antenna 10 is used to receive the wireless signals Z and transmit the control signals C.

The transceiver chip 20 is electrically connected to the antenna 10 and the processor 40. The transceiver chip 20 is used to transmit the wireless signals Z received by the antenna 10 to the processor 40.

The memory 30 is stored with a remote control program and a code being identical to the identification code.

The processor 40 is electrically connected to the memory 30, the remote control unit 50, and the I/O unit 60. The processor 40 is used to receive the wireless signals Z from the transceiver chip 20 and compare the code stored in the memory 30 with the identification code in order to check whether the wireless signals Z is the first type wireless signal or the second type wireless signal. According to the result of checking, the first type wireless signal will be transmitted to the remote control unit 50, and the second type wireless signal will be transmitted to the I/O unit 60 or the transceiver chip 20.

Following description will present the detail action in which the wireless signal access apparatus 1 will take action when a user uses the terminal device 2 to control the television 3 or to browse Internet through the wireless signal access apparatus 1 according to the present embodiment of the invention.

At the initial connection, that is at the first time connecting to the wireless signal access apparatus 1 by terminal device 2, the processor 40 will send the remote control program stored in the memory 30 through the transceiver chip 20 to the terminal device 2 by the antenna 10. The remote control program shall then be received and installed by the terminal device 2. After the remote control program is installed in the terminal device 2, the user can remotely control the television 3 by inputting a specific command via the terminal device 2. The installed remote control program will generate the wireless signal Z of the first type wireless signal including the control data and the identification code filled in the destination address field of the MAC header based on the command instructed by the user.

It is noted that the user could input the command by operating an input device, such as a keyboard or keypad of the terminal device 2 in order to appoint the television 3 in carrying out a specific action. For example, the command "*20*" can be inputted via the terminal device 2 to switch present channel to expected 20th channel on the television 3, or the command "" can be inputted via the terminal device 2 to turn off the television 3. The wireless signal Z of the first type wireless signal containing the control data will be generated by the terminal device 2 according to the inputted command and the wireless signal access apparatus 1 will then detect the remote control command sent out from the terminal device 2**.

In this embodiment, the remote control unit 50 is a Zigbee Radio Frequency for Consumer Electronics (RF4CE) chip complied with IEEE 802.15.4 standard, which is electrically connected to the transceiver chip 20 for receiving the first type wireless signal. The remote control unit 50 retrieves the control data in a frame body field of the first type wireless signal and further examines the control data to obtain the command, and sends out the control signal C according to the command.

In the present embodiment, the control data is a binary string code, which includes a function code representing a control function of the television 3 and an information code representing a set of number. It is noted that the string code may have various lengths according to the designer's requirement. In the present embodiment, the control data is a string code with n bits length long, in which the first m bits represents the function code, and the rest n-m bits represents the information code. Accordingly it may provide $2^m$ set of control functions and $2^{n-m}$ set of numbers. Thus, when receiving the first type wireless signal including the control data (n bits), the remote control unit 50 will retrieve the first m bits and rest n-m bits in the frame body filed of the first type wireless signal to separately obtain the function code and the information code that are so called a command in present embodiment of the invention. For example, assume n=12 and m=4, which means that the first 4 bits of the control data is the function code, and the rest 8 bits is the information code. It further assumed that the function code "1000" represents operation of changing channel and the information code "00000001" represents the number of channel "1", which means the control data are meant to the instruction of "changing channel to channel 1" when the remote control unit 50 retrieves 100000000001 in the frame body field of the first type wireless signal, the remote control unit 50 will generate the control signal C according to the command retrieved in the control data to control the television 3 to switch to channel "1".

The I/O unit 60 is electrically connected to the processor 40. Once receiving the second type wireless signal from the processor 40, the I/O unit 60 will transform the second type wireless signal into the data signal complied with IEEE 802.3 standard and then transmits it to the interface 70. In this embodiment, the interface 70 is a RJ-45 connector connected to the I/O unit 60. The interface 70 will send the data signal to a predetermined address through a RJ-45 wire (not shown).

Accordingly, when the antenna 10 receives the wireless signal Z sent from the terminal device 2, the transceiver chip 20 transmits it to the processor 40. Subsequently, the processor 40 will examine the wireless signal Z to determine if it is a first type wireless signal or a second type wireless signal.

Specifically, once the wireless signal Z is identified as the first type wireless signal, that is the user has sent the command for remotely controlling the television 3, the processor 40 will transmit the first type wireless signal to the remote control unit 50. The remote control unit 50 then generates the Zigbee control signal C according to the control data of the first type wireless signal, and sends out the control signal by the antenna through the transceiver to remotely control the television 3.

On the contrary, if it is determined the wireless signal is the second type wireless signal, that is the user is connecting to the Internet or using the local network sources via the terminal device 2, the processor 40 will transmit the second type wireless signal to the I/O unit 60 or the transceiver chip 20 according to the user's demand; thereafter, the I/O unit 60 transforms the second type wireless signal into the data signal and sends the data signal to a predetermined address through the interface 7, or the second type wireless signal transmitted to the transceiver chip 20 is sent out to another terminal device (not shown) by the antenna 10.

It is noted that when the processor 40 identifies the wireless signal is the first type wireless signal, the processor 40 itself can further retrieve the control data in a frame body field of the first type wireless signal and examine the control data to obtain the command, and control the remote control unit 50 to send out the control signal C to the transceiver chip 20 according to the command.

Figure 3:
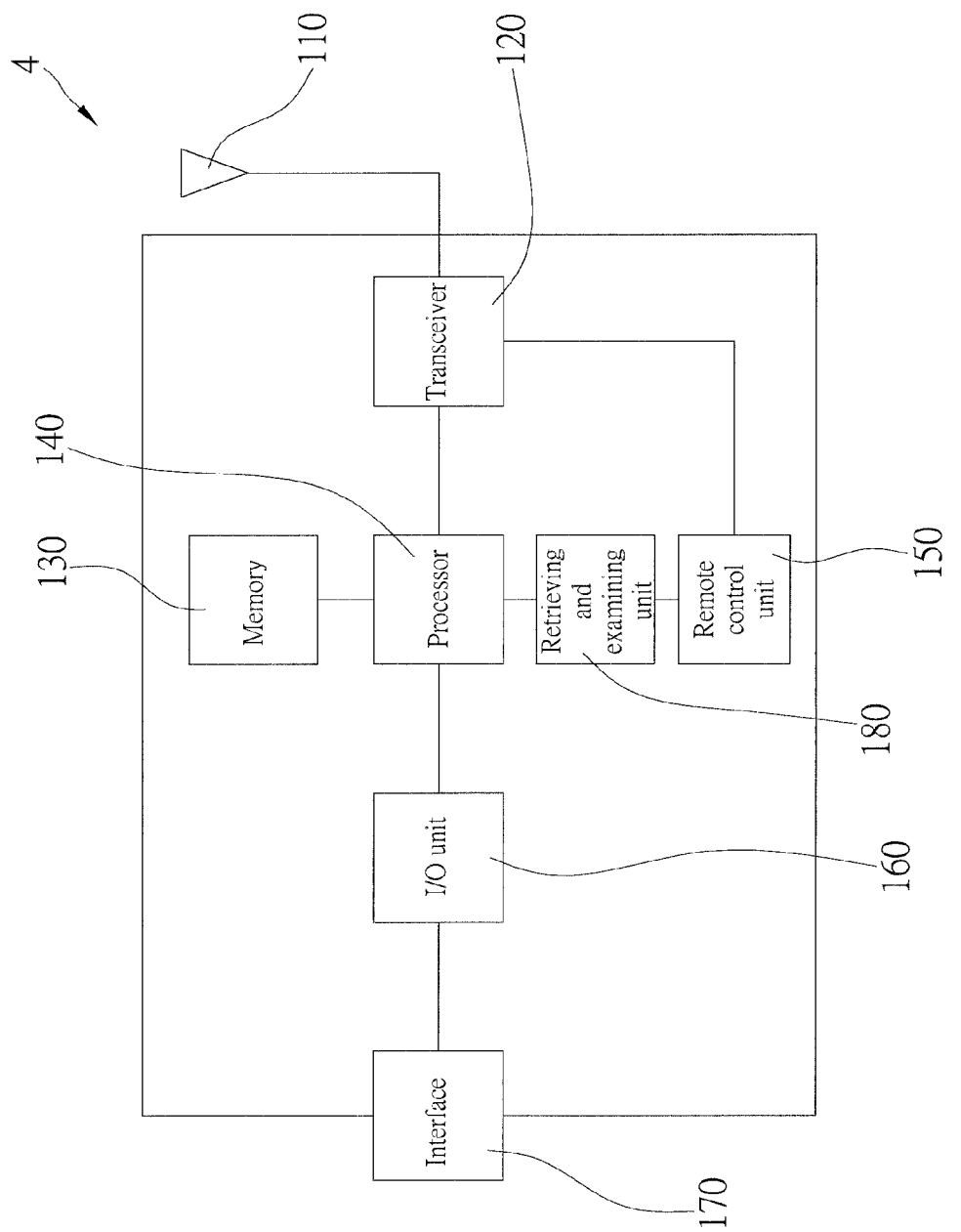
FIG. 3 is a block diagram of a wireless signal access apparatus according to a second preferred embodiment of the present invention.

As shown in FIG. 3, which is the second preferred embodiment of the present invention, a wireless signal access apparatus 4 includes an antenna 110, a transceiver chip 120, a memory 130, an I/O unit 160, and an interface 170. These elements are the similar to those in the first preferred embodiment. The wireless signal access apparatus 4 of the second preferred embodiment further includes a retrieving and examining unit 180. The retrieving and examining unit 180 is a chip electrically connected to a processor 140 and a remote control unit 150. When the processor 140 identifies the wireless signal as a first type wireless signal, the processor 140 transmits the first type wireless signal to the retrieving and examining unit 180 to retrieve and examine the control data in the frame body field of the first type wireless signal. Next, the remote control unit 150 is controlled for sending out the control signal C to the transceiver chip 120 according to the command obtained from the control data.

In this embodiment, the retrieving and examining unit 180 reduces the loading of the processor 140 and the remote control unit 150 to shorten the processing time of the processor 140 and speed up the remote control of the remote control unit 150. Therefore, the user can timely and promptly utilize the wireless signal access apparatus 4 to remotely control the appliance.

It is noted that, the wireless signal access apparatus of the present invention not only can control the television 3, but also can be used to control an air conditioner, a stereo, a digital versatile disk (DVD) player, a Blu-ray disc (BD) player, or other appliances.

In addition, except for the wireless AP, the wireless signal access apparatus of the embodiment of the present invention can be a gateway, a wireless router, or other devices which may be provided to wirelessly connect to the Internet.

The remote control program is installed in the terminal device 2 to generate the first type wireless signal may be obtained by downloading from Internet, compact disc, USB driver, or other relative ways.

The control signal C also may be Bluetooth signal, ultra wideband (UWB) signal, or other signal complied with IEEE 802.15.4 standard. In other words, except for applying the Zigbee RF4CE chip as the remote control unit, the Bluetooth chip and ultra wideband chip may also be used in the present invention.

In conclusion, the wireless signal access apparatus of the embodiment of the present invention can provide the terminal device with function of not only connecting to the Internet but also controlling the appliances. Besides, the wireless signal Z complied with IEEE 802.11 standard and the control signal C complied with 802.15.4 are omnidirectional wireless signals so that the user no longer needs to worry about that the terminal device 2 has to directly point at the appliance or the wireless signal access apparatus of the present invention for remote controlling. In the embodiment of the present invention, the signal transmission takes place at the data link layer in OSI (Opening System Interconnection) model so that the appliance can be controlled in no time by the terminal device as the remote controller.

The description above is a few preferred embodiments of the present invention and the equivalence of the present invention is still in the scope of claim construction of the present invention.

What is claimed is:

1. A wireless signal access apparatus for receiving wireless signals having a frame format complied with IEEE 802.11 standard sent from a terminal device, wherein the frame format of each of the wireless signals has a destination address field in a MAC header thereof; the wireless signals comprise a first type wireless signal having a control data and an identification code, and a second type wireless signal, wherein the identification code is filled in the destination address field of the MAC header in the frame format of the first type wireless signal; the wireless signal access apparatus comprising:
   a processor;
   a memory stored with a code which is identical to the identification code;
   a transceiver electrically connected to the processor;
   an antenna for receiving the wireless signals and transmitting to the processor through the transceiver; and
   a remote control unit electrically connected to the processor and the transceiver,
   wherein the processor compares the code stored in the memory to a content of the destination address field of the MAC header in the frame format of each of the wireless signals, and identifies one of the wireless signals as the first type wireless signal if the code stored in the memory is found identical to the content of the relevant destination address field, which is the identification code, and retrieves and examines the control data attached to the first type wireless signal;
   wherein the remote control unit generates a control signal according to the control data, and sends out the control signal by the antenna through the transceiver to remotely control an appliance.

2. The wireless signal access apparatus as defined in claim 1, wherein the control signal is a Zigbee signal complied with IEEE 802.15.4 standard.

3. The wireless signal access apparatus as defined in claim 1, wherein the remote control unit is a chip complied with Zigbee Radio Frequency for Consumer Electronics (RF4CE) standard.

4. The wireless signal access apparatus as defined in claim 1, further comprising an input/output unit electrically connected to the processor and an interface electrically connected to the input/output unit, wherein the processor transmits the second type wireless signal to the input/output unit, and the input/output unit transforms the second type wireless signal into a data signal and sends out the data signal to a predetermined address through the interface.

5. The wireless signal access apparatus as defined in claim 1, wherein the processor transmits the second type wireless signal back to the transceiver for emission by the antenna.

6. The wireless signal access apparatus as defined in claim 1, wherein the remote control unit retrieves the control data in a frame body field of the first type wireless signal from the processor to obtain a function code and an information code and further examines the function code and the information code to obtain a command, and sends out the control signal according to the command; the control data is a string code with n bits length long, in which the first m bits represents the function code, and the rest n-m bits represents the information code.

7. The wireless signal access apparatus as defined in claim 1, wherein the processor retrieves the control data in a frame body field of the first type wireless signal to obtain a function code and an information code and further examines the function code and the information code to obtain a command, and controls the remote control unit to send out the control signal according to the command; the control data is a string code with n bits length long, in which the first m bits represents the function code, and the rest n-m bits represents the information code.

8. The wireless signal access apparatus as defined in claim 1, wherein the memory comprises a program stored therein, the processor sends the program through the transceiver to the terminal device by the antenna at initial connection of the terminal device, and via the terminal device the program is executed for inputting a command to be transformed as the first type wireless signal having the control data and the identification code filled in a destination address.

9. A wireless signal access apparatus for receiving wireless signals having a frame format complied with IEEE 802.11 standard sent from a terminal device, wherein the frame format of each of the wireless signals has a destination address field in a MAC header thereof; the wireless signals comprise a first type wireless signal having a control data and an identification code, and a second type wireless signal, wherein the identification code is filled in the destination address field of the MAC header in the frame format of the first type wireless signal; the wireless signal access apparatus comprising:
  a processor;
  a memory stored with a code which is identical to the identification code;
  a transceiver electrically connected to the processor;
  an antenna for receiving the wireless signals and transmitting to the processor through the transceiver;
  a retrieving and examining unit electrically connected to the processor; and
  a remote control unit electrically connected to the retrieving and examining unit and the transceiver,
  wherein the processor compares the code stored in the memory to a content of the destination address field of the MAC header in the frame format of each of the wireless signals, and identifies one of the wireless signals as the first type wireless signal if the code stored in the memory is found identical to the content of the relevant destination address field, which is the identification code, and transmits the first type wireless signal to the retrieving and examining unit;
  wherein the retrieving and examining unit retrieves and examines the control data attached to the first type wireless signal from the processor;
  wherein the remote control unit generates a control signal according to the control data, and sends out the control signal by the antenna through the transceiver to remotely control an appliance.

10. The wireless signal access apparatus as defined in claim 9, wherein the control signal is a Zigbee signal complied with IEEE 802.15.4 standard.

11. The wireless signal access apparatus as defined in claim 9, wherein the retrieving and examining unit retrieves the control data in a frame body field of the first type wireless signal from the processor to obtain a function code and an information code, and further examines the function code and the information code to obtain a command, so that the remote control unit sends out the control signal according to the command; the control data is a string code with n bits length long, in which the first m bits represents the function code, and the rest n-m bits represents the information code.

12. The wireless signal access apparatus as defined in claim 9, wherein the remote control unit retrieves the control data in a frame body field of the first type wireless signal from the processor to obtain a function code and an information code and further examines the function code and the information code to obtain a command, and sends out the control signal according to the command; the control data is a string code with n bits length long, in which the first m bits represents the function code, and the rest n-m bits represents the information code.

13. The wireless signal access apparatus as defined in claim 9, wherein the processor transmits the second type wireless signal back to the transceiver for emission by the antenna.

14. The wireless signal access apparatus as defined in claim 9, wherein the memory comprises a program stored therein, the processor sends the program through the transceiver to the terminal device by the antenna at initial connection of the terminal device, and via the terminal device the program is executed for inputting a command to be transformed as the first type wireless signal having the control data and the identification code filled in a destination address.

15. A method for remotely controlling an appliance by a wireless signal access apparatus, wherein a terminal device is wirelessly connected to the wireless signal access apparatus and the wireless signal access apparatus receives wireless signals complied with IEEE 802.11 standard from the terminal device, and the wireless signals comprise a first type wireless signal having a control data filled in a frame body field; the method comprising the steps of:
  receiving the wireless signals sent from the terminal device,
  identifying one of the wireless signals as the first type wireless signal by comparing a predetermined code stored in a memory to an identification code filled in a destination address field of a MAC header of the wireless signal and determining the predetermined code and the identification code being identical; and
  retrieving and examining the control data filled in a frame body field of the first type wireless signal to obtain a command according to the control data, generating a control signal complied with IEEE 802.15 standard according to the command, and sending the control signal to the appliance for operation.

16. The method as defined in claim 15, wherein the wireless signal access apparatus retrieves the control data from the frame body field of the first type wireless signal and examines the control data to obtain a function code and an information code and to obtain the command according to the function code and the information code, and sends out the control signal according to the command.

17. The method as defined in claim 16, wherein the control data is a n bits string code, and the step of examining the control data to obtain the function code and the information code further comprises the steps of examining the first m bits of the n bits string code to obtain the control code and examining the rest n-m bits of the n bits string code to obtain the information code.

18. The method as defined in claim 15, wherein the control signal is a Zigbee signal complied with IEEE 802.15.4 standard.

\* \* \* \* \*